United States Patent [19]

Schönenberger

[11] Patent Number: 5,687,851

[45] Date of Patent: Nov. 18, 1997

[54] METHOD OF SORTING A PLURALITY OF INDIVIDUALLY CONVEYED ARTICLES INTO GROUPS IN AT LEAST ONE SORTING STEP

[75] Inventor: Rolf Schönenberger, Landsberg/Lech, Germany

[73] Assignee: RSL Logistik GmbH & Co., Germany

[21] Appl. No.: 627,556

[22] Filed: Apr. 4, 1996

[30] Foreign Application Priority Data

Apr. 11, 1995 [DE] Germany ............... 195 13 734.5

[51] Int. Cl.$^6$ ............... B07C 5/00
[52] U.S. Cl. ............... 209/44.1; 209/912; 209/937; 198/890; 198/606
[58] Field of Search ............... 209/44.1, 657, 209/912, 937; 198/890, 890.1, 465.4, 606

[56] References Cited

U.S. PATENT DOCUMENTS

| | | | |
|---|---|---|---|
| 2,998,136 | 8/1961 | Gerisch ............... | 209/937 X |
| 5,388,703 | 2/1995 | Schonenberger et al. ............... | 209/937 X |

FOREIGN PATENT DOCUMENTS

| | | |
|---|---|---|
| C-3519630 | 5/1991 | Germany . |
| A-4226066 | 2/1994 | Germany . |

*Primary Examiner*—Boris Milef
*Attorney, Agent, or Firm*—Finnegan, Henderson, Farabow, Garrett & Dunner, L.L.P.

[57] ABSTRACT

Described is a method of sorting a plurality of individually conveyed articles in groups in at least one sorting step in a suspension-type conveyor, the articles being introduced in substantially unsorted manner into a first conveyor circle and being delivered from said circle in sorted fashion to at least one second conveyor circle, with an identification source identifying every article to be conveyed individually. To be able to use such a method in a universal manner and to accelerate the sorting process, the articles are delivered in a partial quantity containing a predetermined number in a first sorting step, independently of the loaded state of the first conveyor circle, from the first conveyor circle to the second conveyor circle as soon as the partial quantity of articles to be sorted in the first sorting step has been identified on the first conveyor circle.

7 Claims, 1 Drawing Sheet

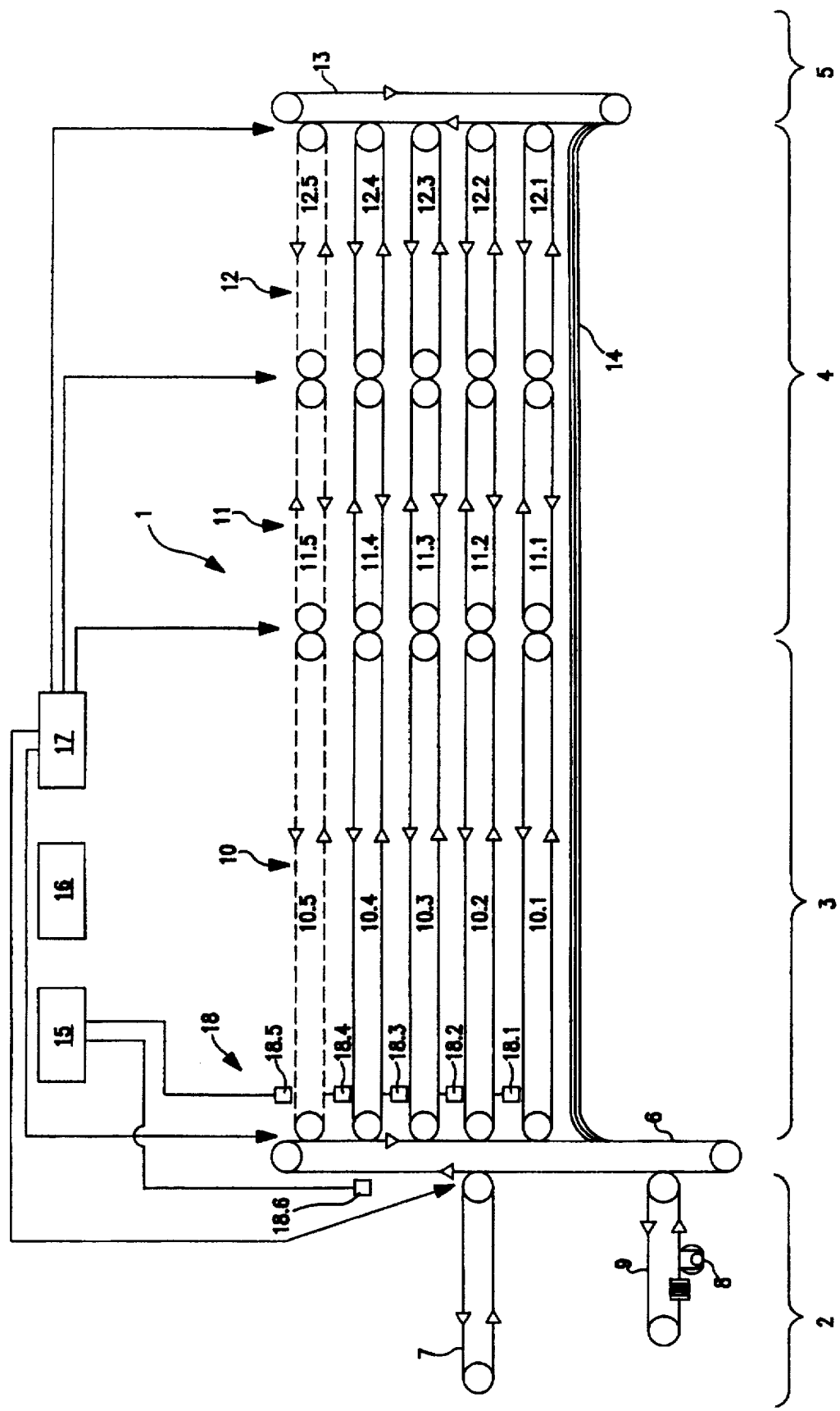

METHOD OF SORTING A PLURALITY OF INDIVIDUALLY CONVEYED ARTICLES INTO GROUPS IN AT LEAST ONE SORTING STEP

BACKGROUND

The present invention relates to a method of sorting a plurality of individually conveyed articles in a suspension-type conveyor.

Such a method is known from German patent publication DE-OS 42 26 066. The known method operates with a plurality of sequentially arranged circular conveyors on which articles to be individually conveyed are circulated. The articles are delivered to the first circular conveyor in a disordered manner or in a roughly ordered manner. After delivery of the articles to the first circular conveyor has been terminated, the sorting process starts. The desired groups are first handed over from the first circular conveyor to the second circular conveyor, the conveying direction being reversible to collect the articles on the second circular conveyor in the desired order at the same time. It is also possible to collect two different groups on the second conveyor at the same time. Furthermore, it is possible to couple a third circular conveyor or other circular conveyors with the second circular conveyor, a specific group being assigned to each of the circular conveyors and said circular conveyor being possibly designed as a storage place for said group at the same time. Hence, the known operating method is fixed to sorting steps. For instance, the sorting steps will only be taken if all of the articles to be sorted are present on the first circular conveyor, being sensed by the identification means. On the one hand, the sorting time is prolonged thereby; on the other hand, the known method is not of such a universal application that it could cope with different sorting tasks. DE 35 19 630 C2 discloses a method and apparatus for completing products consisting of several parts in a storage room divided into a plurality of departments. This method is meant to ensure that two predetermined and associated articles, particularly individual articles of clothing, such as jacket and trousers of a suit, which are delivered at different times reach the same storage place. To this end, the articles are guided past an identification means where they are identified and where a special storage place is assigned to them. This information is printed on a label which is attached to the article. The article is then discharged onto a distribution conveyor which passes the article along a number of storage corridors in which further branched conveyors are arranged. When the article has reached the associated storage corridor, it is ejected from the distribution conveyor and moved via a branch to the predetermined storage place to which it is hung by hand.

SUMMARY OF THE INVENTION

Hence, this method is a kind of guide system which is to ensure that a specific article reaches a predetermined storage place over the shortest way possible and with maximum reliability, but it is not a method for sorting a plurality of individually conveyed articles in groups in at least one sorting step; and the articles are also not transferred from a first circular conveyor to a second circular conveyor. Such a method could certainly not cope with a sorting task which presupposes the potential ability to compile a substantially unlimited multitude of articles in a desired manner in groups, to change their sequence and to discharge them optionally in a delayed or accelerated manner.

Hence, it is the object of the present invention to provide a time-saving method of universal application for sorting articles.

The method of the invention is based on the idea that the sorting process could be accelerated considerably if, in contrast to the prior art, the method was no longer based on the individual articles to be sorted, but on a goods flow that should be optimum if possible. The most different sorting tasks can then be performed on such a basis without any major changes in the structure of the transporting device. Thanks to the design according to the invention, the first conveyor circle acts as a preceding or receiving buffer means on which articles can be placed freely and optionally chaotically, and which receives everything that is fed at any desired time. The identification means identifies every individual article and starts the delivery of a predetermined number of articles, which comply with the same criterion of selection, to the second conveyor circle as soon as said predetermined number of articles are positioned on the first conveyor circle. In an extreme case delivery of such an article can already be started as soon as only one of the articles has been placed on the first conveyor circle in accordance with the special criterion of selection. The other articles remain in the first conveyor circle until sorted according to criteria of selection they comply with.

It is especially expedient when every other sorting step is respectively taken upon delivery to a separate conveyor circle, since the individual conveying steps can thus be performed substantially at the same time, which further reduces the sorting time.

The sorting time can be even further reduced if the next sorting step is already started whilst the preceding sorting step has not been finished yet.

The buffer capacity of the first conveyor circle can be increased and is adapted to the respective requirements in an improved manner.

Additional objects and advantages of the invention will be set forth in part in the description which follows, and in part will be obvious from the description, or may be learned by practice of the invention. The objects and advantages of the invention may be realized and attained by means of the instrumentalities, steps, and combinations particularly pointed out in the appended claims.

DESCRIPTION OF THE PREFERRED EMBODIMENT

An embodiment of the invention will be described in the following with reference to a single drawing which schematically shows a suspension-type conveyor means 1 which is suited for performing the method according to the invention.

In the illustrated embodiment, the suspension-type conveyor means 1 comprises a feed zone 2, a buffer zone 3, a sorting zone 4, and a discharge zone 5. The feed zone 2 contains a supplier 6 which is expediently designed as a circular conveyor and rotates in the direction marked by arrows. The supplier 6 may have arranged upstream thereof a loading conveyor 7 which is also designed as a circular conveyor, rotates in the direction marked by arrows and feeds the supplier 6 with the articles to be conveyed.

The suspension-type conveyor means 1 is composed of commercial conveyors, which need not be explained in more detail.

For the purpose of the following description, the term "articles" is meant to designate both individual goods or units of goods, such as articles of clothing hung onto a respective hanger or ensembles (suit, costume) hung onto a hanger, or a plurality of goods which are jointly transported by one and the same conveyor means over their whole path.

A working place 8 at which wrongly sorted articles are checked and either removed from the conveyor circuit in the suspension-type conveyor means 1 or fed again via supplier 6 into the conveyor circuit is also provided in the feed zone 2 at another conveyor 9.

The buffer zone 3 contains a plurality of first conveyor circles 10 which are formed as individual circular conveyors and of which five conveyor circles 10.1, 10.2, 10.3, 10.4 and 10.5 are shown. Each of said conveyor circles 10 is fed via supplier 6 across a respective shunt (not shown).

In sorting zone 4, a first conveyor circle 10 is respectively followed by a second conveyor circle 11 which is again formed as an individual circular conveyor, with five second conveyor circles 11.1, 11.2, 11.3, 11.4 and 11.5 being again shown. Each of the second conveyor circles 11 is followed within sorting zone 4 and via a respective shunt by a third conveyor circle 12, with the five third conveyor circles 12.1, 12.2, 12.3, 12.4 and 12.5, which are formed as circular conveyors, being again shown. The third conveyor circles 12, too, rotate in the directions marked by arrows.

Each of the third conveyor circles 12.1, 12.2, 12.3, 12.4 and 12.5 is connected via a respective shunt (not shown) to a joint discharge conveyor 13 in the discharge zone 5.

If necessary, a conveyor path 14 leads from the discharge conveyor 13 back to the supplier 6. The conveyor paths 14 may be designed as branches, as shown, or also as circular conveyors, if necessary, and serve to return either wrongly sorted or defective articles or empty conveying means when the articles to be conveyed are e.g. removed from their conveying means at the discharge conveyor 13.

Furthermore, the suspension-type conveyor means 1 comprises an only schematically shown identification means 15 which is connected via a computer 16 to control means 17. Identification means, computer and control means are only shown as boxes and contain commercial components.

The identification means 15 comprises at least one respective sensor 18 which can be designed as a reading device for the codes, or the like, provided on the articles, which furnish information e.g. about the type, number and sequence of the articles positioned in the suspension-type conveyor means 1. In the illustrated embodiment, a respective sensor 18.1, 18.2, 18.3, 18.4 and 18.5 is assigned to each of the first conveyor circles 10.1, 10.2, 10.3, 10.4 and 10.5. Of course, other sensors or reading devices may be provided at other places of the suspension-type conveyor means 1, e.g. in the area of supplier 6 or in the area of discharge conveyor 13.

The signals of the sensors 18 are supplied by the identification means 15 to the computer 16 which activates control means 17 according to the respective program. The control means 17 is at least connected to the shunts between the conveyor circles 10 and 11, between the conveyor circles 11 and 12 and between the third conveyor circle 12 and the discharge conveyor 13 and opens and closes the same according to instructions from the computer. The control means 17 can additionally control the shunts between the feeder 7 and supplier 6 and the supplier 6 and the first conveyor circles 10. Moreover, the control means 17 can control the rotational speed of the conveyor circles.

It is assumed that in the suspension-type conveyor means 1 articles of different types and in random order are to be combined in groups which solely contain articles of a single type in a predetermined order. The articles are distributed over all of the first conveyor circles 10, 10.2, 10.3, 10.4, 10.5 via supplier 6 at random and substantially only in accordance with the conveying capacity of the first conveyor circles 10. The first conveyor circles thus serve as rough buffer means on which articles can be placed freely and chaotically. This ensures a high degree of exploitation of the circles. Each of the sensors 18.1, 18.2, 18.3, 18.4, 18.5 identifies every individual article on the associated conveyor circle 10 in the course of time, so that the computer 16 can exactly indicate the position of every individual article on each of the first conveyor circles 10.1 to 10.5 in response to the conveying speed and the length of the conveying path at any time.

The number of the articles in the groups to be formed are subdivided into predetermined partial quantities. Each of the partial quantities will immediately be requested from the first conveyor circles as soon as a number of articles corresponding to said partial quantity have been collected on one of the first conveyor circles 10.1 to 10.5. The shunt between the respective first conveyor circle 10.1 to 10.5 and the associated second conveyor circle 11.1 to 11.5 will be operated via control means 17 for ejecting purposes as soon as an article of this partial quantity is in the area of the shunt.

Articles of the same type of this partial quantity are then delivered from the respective second conveyor circle 11.1 to 11.5 to the associated third conveyor circle 12.1 to 12.5 in such a manner that the articles are positioned on the third conveyor circles 12.1 to 12.5 already in the respectively desired order. During this sorting process a second partial quantity of articles of this type can readily be handed over from the corresponding first conveyor circle 10 to the associated second conveyor circle 11 without the sorting step between the second conveyor circle 11 and the third conveyor circle 12 being interfered with, since the articles are individually identified.

If articles of the type to be sorted are positioned on a plurality of first conveyor circles 10 and if all articles of this type are to be delivered jointly in a predetermined order, the articles which are already presorted in their order on the third conveyor circles 12 will be transferred via the correspondingly controlled shunts in such an order onto the discharge conveyor that the desired group of articles of one type are finally positioned on the discharge conveyor 13 in the predetermined order and can there either be removed or transported away for further handling.

To perform a more thorough fine sorting step, the articles can also circulate several times, especially on the second and third conveyor circles 11 and 12, so that a purposeful introduction of articles is also possible between already collected groups on the respectively subsequent conveyor circle 11 or 12.

To facilitate the sorting operation, the articles can be delivered in a presorted manner, instead of a chaotic manner, to the first conveyor circles, the presorting step being expediently performed such that a specific number of conveyor circles 10 are reserved for a specific type of articles or for specific types of articles, so that only articles of two types are e.g. positioned on the conveyor circle 10.1. To ensure an automatic feeding of buffer zone 3, the supplier 6 should be provided with another sensor 18.6.

If defective articles or wrongly coded articles are detected, they can be conveyed from the discharge conveyor 13 via conveyor path 14 back to the supplier 6. It is then expediently determined by another sensor (not shown), e.g. by a light barrier, that such an article is returned, so that the shunt (not shown) between the supplier 6 and the conveyor 9 is operated to convey this article to the conveyor 9 and then to the working place 8. The article can again be introduced into supplier 6 from working place 8.

Instead of the above-described automatic feeding operation, the articles can also be introduced manually at working place 8 or at another working place at feeder 7 into supplier 6 or, however, manually directly into the first conveyor circles 10. A combination of automatic and manual feeding is also possible. The joint discharge conveyor can also be dispensed with if the articles are directly removed at the last circular conveyor of the sorting zone. Instead of the illustrated groups of three circular conveyors, it is also possible to use groups of two circular conveyors or groups of circular conveyors with more than three conveyor circles. Moreover, every conveyor circle can consist of a plurality of circles having the same function and control.

What is claimed is:

1. A method of sorting a plurality of individually conveyed articles into groups in at least one sorting step in a suspension-type conveyor means, said method comprising:

introducing said articles into a first conveyor circle by placing said articles in a substantially unsorted manner on said first conveyor circle;

conveying said articles in a row through said first conveyor circle;

identifying each article in said first conveyor circle with respect to a specific group and with respect to its location within said row;

determining the number of identified articles of the same specific group;

providing a signal when a first partial quantity containing a predetermined number of articles of the same specific group has been determined; and delivering said predetermined number of articles of said first partial quantity selectively from said first conveyor circle to a second conveyor circle independently of the loaded state of said first conveyor circle once the partial quantity of the articles to be sorted in the first sorting step has been identified on said at least one conveyor circle.

2. A method according to claim 1 further including a second sorting step, said second sorting step being performed by delivering said articles from said second conveyor circle to a third conveyor circle.

3. A method according to claim 2, wherein the delivering of the articles from said second conveyor circle to said third conveyor circle includes delivering of the articles independently of the loaded state of said second conveyor circle.

4. A method according to any one of claims 1 to 3, wherein said step of introducing said articles into a first conveyor circle includes introducing said articles from a common supplier to each first conveyor circle of a plurality of groups of circular conveyors, each conveyor group comprising a first conveyor circle and at least a second conveyor circle.

5. A method according to claim 4, including the additional step of discharging said groups of circular conveyors via a common discharge conveyor.

6. A method according to any one of claims 1–3, including the additional step of circulating articles on at least one of said conveyor circles more than one time.

7. A method according to claim 4, wherein said step of introducing said articles into a first conveyor circle includes randomly introducing said articles into respective ones of the first conveyor circles.

* * * * *

UNITED STATES PATENT AND TRADEMARK OFFICE
CERTIFICATE OF CORRECTION

PATENT NO. : 5,687,851
DATED : November 18, 1997
INVENTOR(S) : Schönenberger

It is certified that error appears in the above-identified patent and that said Letters Patent is hereby corrected as shown below:

Claim 1, column 6, line 2, change "first" to --at least one--;

line 3, change "at least one" to --first--.

Signed and Sealed this

Twenty-sixth Day of May, 1998

Attest:

BRUCE LEHMAN

Attesting Officer

Commissioner of Patents and Trademarks